United States Patent [19]

Nakadera et al.

[11] Patent Number: 5,587,265
[45] Date of Patent: Dec. 24, 1996

[54] TONER FOR DEVELOPING STATIC CHARGE IMAGES AND PROCESS FOR PREPARING THE SAME

[75] Inventors: Kazue Nakadera; Haruo Okutani; Hideki Kurebayashi, all of Shizuoka, Japan

[73] Assignee: Tomoegawa Paper Co., Ltd., Tokyo, Japan

[21] Appl. No.: 463,502

[22] Filed: Jun. 5, 1995

[30] Foreign Application Priority Data

Jun. 3, 1994 [JP] Japan .................................. 6-145290
Jun. 3, 1994 [JP] Japan .................................. 6-145291

[51] Int. Cl.$^6$ ................................................ G03G 9/087
[52] U.S. Cl. ............................................ 430/109; 430/137
[58] Field of Search ............................ 430/109, 110, 430/904, 137

[56] References Cited

U.S. PATENT DOCUMENTS

| | | | |
|---|---|---|---|
| 4,877,704 | 10/1989 | Takagiwa et al. | 430/99 |
| 4,935,327 | 6/1990 | Takizawa et al. | 430/110 |
| 4,960,664 | 10/1990 | Yamada et al. | 430/109 |
| 4,980,448 | 12/1990 | Tajiri et al. | 430/109 |
| 5,330,870 | 7/1994 | Tanaka et al. | 430/109 |
| 5,389,485 | 2/1995 | Katagiri et al. | 430/110 |

FOREIGN PATENT DOCUMENTS

| | | |
|---|---|---|
| 0128569 | 12/1984 | European Pat. Off. . |
| 0164257 | 12/1985 | European Pat. Off. . |
| 0369492 | 5/1990 | European Pat. Off. . |
| 0606873 | 7/1994 | European Pat. Off. . |
| 3132619 | 6/1982 | Germany . |
| 54-86342 | 7/1979 | Japan . |
| 54-114245 | 9/1979 | Japan . |
| 56-1952 | 1/1981 | Japan . |
| 56-21136 | 2/1981 | Japan . |
| 56-168660 | 12/1981 | Japan . |
| 57-37353 | 3/1982 | Japan . |
| 58-14146 | 1/1983 | Japan . |
| 58-14147 | 1/1983 | Japan . |
| 58-11955 | 1/1983 | Japan . |
| 59-30542 | 2/1984 | Japan . |
| 61-105561 | 5/1986 | Japan . |
| 61-105563 | 5/1986 | Japan . |
| 61-124961 | 6/1986 | Japan . |
| 61-275769 | 12/1986 | Japan . |
| 2082788 | 3/1982 | United Kingdom . |

*Primary Examiner*—John Goodrow
*Attorney, Agent, or Firm*—Oblon, Spivak, McClelland, Maier & Neustadt, P.C.

[57] ABSTRACT

A toner for developing an electrostatic image comprising at least a colorant and a binder resin, characterized in that the main component of the binder resin is a polyester resin, and the polyester resin is containing a polymer prepared by reacting a polyester oligomer and at least one compound selected form the group consisting of long chain alcohols and long chain carboxylic acids which have 12 or more carbon atoms.

10 Claims, 2 Drawing Sheets

FIRST PROCESS

SECOND PROCESS

TONER FOR DEVELOPING STATIC CHARGE IMAGES AND PROCESS FOR PREPARING THE SAME

BACKGROUND OF THE INVENTION

1. Field of the Invention

The present invention relates to a toner for developing an electrostatic image (hereinafter referred to as "toner") by an electrophotography process, electrographic recording method, or electrographic printing method or the like.

2. Background Art

In an electrophotography process, electrographic recording method, electrographic printing method, or the like, an electrostatic image on a photoconductive material is visualized by a toner. The toner is comprised mainly of a binder resin and a pigment. The visualized image is fixed directly on the photoconductive material or is transferred to other medium member and then fixed.

Therefore, characteristics required for the toner include, characteristics such as developing properties on the photoconductive material, transferring properties and fixing properties onto the paper. Moreover, a low energy fixing property can be required for energy conservation.

The heat-fixing process of the toner may be divided into a non-contact heating process such as an oven-fixing process, and a contact heating process such as a heated roller fixing process. The contact heating process may be desirable because it is highly heat efficient does not use large amount of electric power for heating fixing parts, and requires relatively compact.

However, the contact heating process has disadvantages in that it generates an offset phenomenon. Offset phenomenon is that parts of a toner forming an image transfers to the hot roller surface at a fixing time and is transferred to a subsequent paper to contaminate an image.

In order to prevent the generation of offset phenomena, for example, it is suggested to include compounds having releasability such as waxes, to the toner. However, when compounds such as waxes are contained in toners, the so-called "filming phenomena" (which is a phenomena in which a wax-like thin film adheres to the surface of the photoconductive material) occurs. Consequently, a toner comprising compounds having releasability has low storage stability.

It has also been suggested that a toner be comprised of polymers having high molecular weights. The generation of offset phenomena can thereby be prevented; however, another problem was then encountered. The softening temperature of the toner comprised of the polymer having high molecular weights was high, and consequently the fixing temperature became too high. Moreover, the polymer was tough, and therefore it is difficult to pulverize the polymer mixture in order to prepare toner having a uniform diameter.

The toner comprised of vinyl polymers having a broad molecular weight distribution, such as styrene as a binder resin, was suggested as the toner which can solve the above problems. The toner can be prevented from generating offset phenomena and has acceptable fixing properties at high temperatures. However, the fixing properties of the toner at low temperatures was worse.

Besides these toners, the toner comprised of polyester resin as a binder resin was suggested as a toner which can be fixed at a low fixing temperature. In the case of using a condensed resin such as polyester resin, polymers having a relative low molecular weight were used. However, these toners have problems of generating offset phenomena at high fixing temperatures.

Moreover, Japanese Patent Application, First Publication Sho 54-114245, Japanese Patent Application, First Publication Sho 58-1195, and Japanese Patent Application, First Publication Sho 58-14147 disclosed the toner comprised of vinyl polymers having high molecular weight resins and polyester resins having low molecular weight resins. These toners can prevent the generation of the offset phenomenon on caused by rising the temperature of the heat-fixing roller more than a constant temperature. However, mixing the polymers uniformly was difficult; therefore, it was difficult to prepare the toner having a uniform triboelectric properties.

Japanese Patent Application, First Publication Sho 54-86342, Japanese Patent Application, First Publication Sho 56-952, Japanese Patent Application, First Publication Sho 56-21136, Japanese Patent Application, First Publication Sho 56-168660, Japanese Patent Application, First Publication Sho 57-37353, Japanese Patent Application, First Publication Sho 58-14146, Japanese Patent Application, First Publication Sho 59-30542, Japanese Patent Application, First Publication Sho 61-105561, Japanese Patent Application, First Publication Sho 61-105563, Japanese Patent Application, First Publication Sho 61-124961, and Japanese Patent Application, First Publication Sho 61-275769 disclosed toners comprised of a resin having cross linking structures as monomer components of polyester resins, which is comprised of alcohols having three or more hydroxyl groups and/or carbonic acids having three or more carboxyl groups. However, when toners comprised of polyhydric alcohols and/or polycarboxylic acid at a ratio of 30 mol % or less per a toner, the cross linking reaction did not proceeded satisfactorily, therefore it was not possible to satisfactory offset preventing effects. In contrast, in the case of polyhydric alcohols and/or polycarboxylic acids at a ratio of 30 mol % or greater per toner, toners exhibited a good offset preventing property, but a moisture resistance of the toner was substantially deteriorated due to remaining non-reactional alcoholic hydroxyl groups or carboxyl groups in the carboxylic acids in the toner.

The object of the present invention is to provide a toner to solved the above problems and which has good developing properties, transferring properties, and fixing properties. In particular, the present invention provides a toner having good fixing properties at low temperatures, and which is suitable for a contact heated fixing process because it has offset preventing properties.

SUMMARY OF THE INVENTION

The present invention provides a toner comprising at least a colorant and a binder resin, characterized in that the main component of the binder resin is a polyester resin, and the polyester resin containing a polymer prepared by reacting a polyester oligomer and at least one compound selected from the group consisting of long chain alcohols and long chain carboxylic acids which have 12 or more carbon atoms.

The first production process of the present invention provides a toner production method characterized in consisting of the steps of:

a first reactional stage wherein a polyester oligomer is obtained by reacting a polyhydric alcohol and a compound (herein after referred to as "short chain aliphatic/ aromatic polybasic acid component" is selected from the group consisting of an aliphatic polybasic acid component which has 11 or fewer carbon atoms and an aromatic polybasic acid component;

a second reactional stage wherein a long chain aliphatic carboxylic acid having 12 or more carbon atoms (herein after referred to simple as "long chain aliphatic carboxylic acid") is added to and reacted with the obtained polyester oligomer, obtaining a polyester resins containing the polymer which is the product of the reaction between the long chain aliphatic carboxylic acid and the polyester oligomer (hereinafter referred to simply as "a polymer of polyester oligomer-long chain aliphatic carboxylic acid"); and a process wherein additives such as a colorant are added to the obtained polyester resins, melted and kneaded, and then pulverized and classified.

The second production method of the present invention provides a toner production method characterized in consisting of the steps of:

a first reactional stage wherein a polyester oligomer is obtained by reacting a polybasic acid with a compound (herein after referred to as "short chain aliphatic/aromatic alcohol component") is selected from the group consisting of an aliphatic alcohol component which has 11 or were carbon atoms, and an aromatic alcohol component; and a second reactional stage wherein a polyester resins is obtained by adding a long chain aliphatic alcohol having 12 or more carbon atoms (herein after referred to simply as "long chain aliphatic alcohol") to the obtained polyester oligomer, and reacting the mixture and obtaining a polyester resins which contains a polymer which is the product of the reaction between the long chain aliphatic alcohol and the polyester oligomer (the polymer hereinafter referred to simply as "a polymer of polyester oligomer-long chain aliphatic alcohol"); and adding additives such as a colorant to the obtained polyester resins, and melting and kneading, followed by pulverizing and classifying.

Moreover, the polyester resins is not mere mixtures of polyester oligomer and a polymer of polyester oligomer-long chain aliphatic carbonic acid, or polyester oligomer and a polymer of polyester oligomer-long chain aliphatic alcohol, which is reaction products produced by the first process and by the second process of the present invention.

PREFERRED EMBODIMENTS

Figure 1:
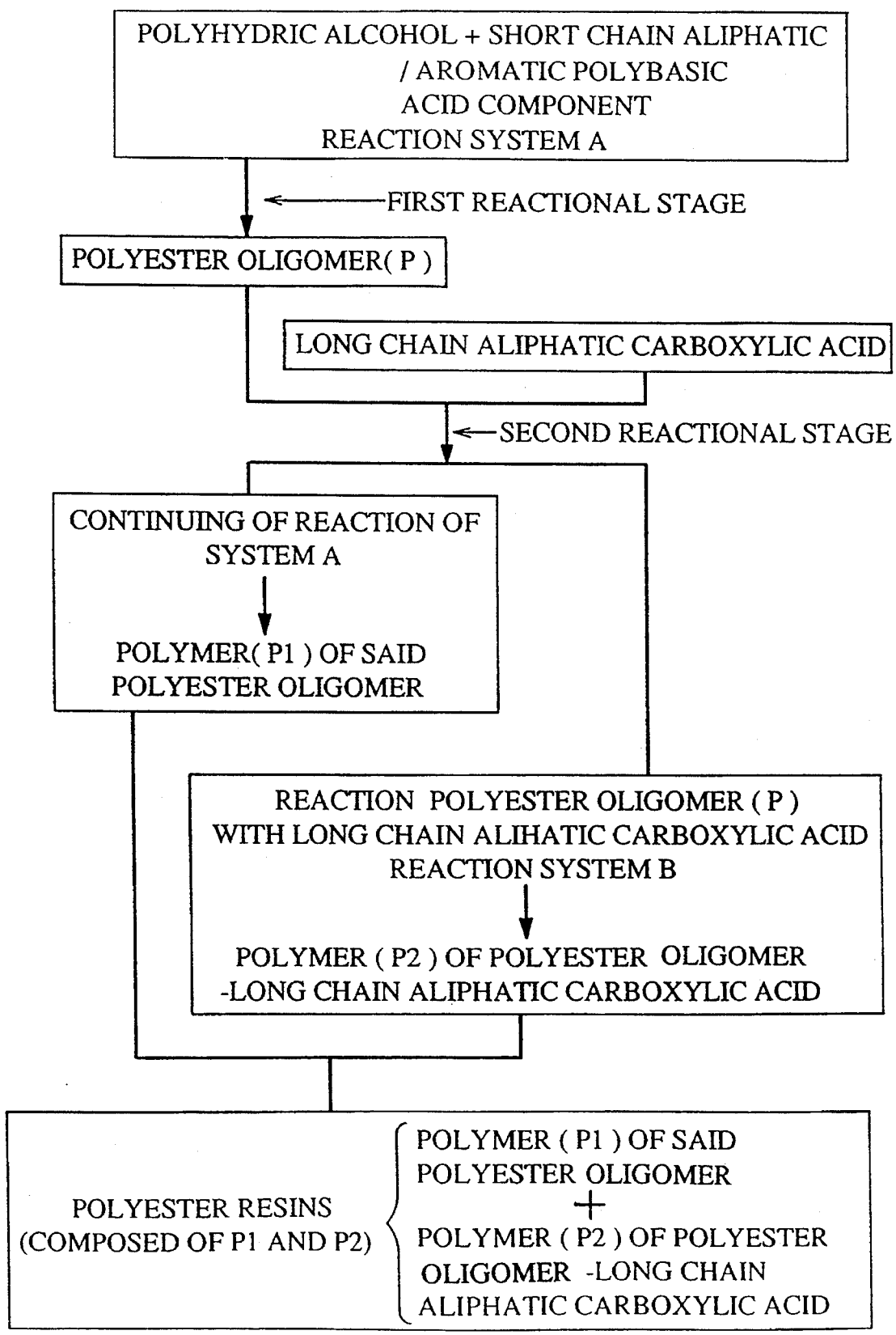
FIG. 1 shows the steps of the first production method of the present invention.

A detailed explanation will now follow of the toner of the present invention and the production method therefore.

The toner of the present invention principally employs a polyester resins as a binding resin. This polyester resin contains polymers formed by reacting the aforementioned polyester oligomer with at least one compound selected from the group comprising of long chain alcohols having 12 or more carbon atoms and long chain carboxylic acids having 12 or more carbon atoms.

In the toner of the present invention, the one or more compounds selected from the group comprising long chain alcohols having 12 or more carbon atoms and long chain carboxylic acids having 12 or more carbon atoms is employed as a cross-linker component and/or a side chain of the polyester oligomer. For this reason, it is possible to better prevent a reduction in the glass transition point of the obtained polyester resin in this case as compared to the case where the aforementioned compound(s) is employed in the main chain of the polyester resin.

Accordingly, the toner of the present invention containing a polyester resins having the aforementioned characteristics will fix over a wide range of temperatures and has superior capabilities with regard to storage.

The polyester oligomer mentioned in the present invention is rigid. However, the one or more compounds selected from the group consisting of long chain alcohols having 12 or more carbon atoms and long chain carboxylic acids having 12 or more carbon atoms is flexible because it is a long chain aliphatic component. For this reason, for the reason of joining the rigid polyester oligomer using the pliable long chain aliphatic components, the obtained polyester resin as a hole has a flexible, or more concretely, an elastic character.

Accordingly, the toner of the present invention which principally employs a resin having these superior characteristics as a binding agent has superior low temperature fixing properties as well as offers the effect of preventing offsetting.

The toner of the present invention which has the aforementioned excellent characteristics can be obtained by means of the first and second production methods shown below.

An explanation will first be made of the first toner production method using FIG. 1.

In the first reactional stage in this method, a polyhydric alcohol and a short chain aliphatic/aromatic polybasic acid component (indicated as reaction system A) are reacted together.

Preferred examples of the polyhydric alcohol include diol and polyol.

Preferred examples of the short chain aliphatic/aromatic polybasic acid component include dicarboxylic acid, polycarboxylic acid, dicarboxylic acid having a phenolic hydroxyl group, and anhydrides and low alkyl ester of these.

The preferred combinations of these components are as follows.

(a) As the polyhydric alcohol: diol component

As the short chain aliphatic/aromatic polybasic acid component: dicarboxylic acid, an anhydride or a low alkyl ester thereof, and dicarboxylic acid having a phenolic hydroxyl group, an anhydrides or a low alkyl ester thereof.

(b) As the polyhydric alcohol in (a): additionally add a polyol component.

(c) As the short chain aliphatic/aromatic polybasic acid component in (a): additionally add a polycarboxylic acid.

(d) For the polyhydric alcohol in (c): additionally add a polyol component.

In the following, preferred compounds used in the reaction system A will be presented.

The diol components are, for example, diethanolamine, ethyleneglycol, diethyleneglycol, isopreneglycol, octanediol, 2,2-diethyl-1,3-propanediol, spiroglycol, neopenthylglycol, 1,3-butanediol, 1,4-butanediol, 2-butyl-2- ethyl-1,3-propanediol, 1,6-hexanediol, hexyleneglycol, 1,5-pentanediol, 3-methyl-1,5-pentanediol, hydrobenzoin, bis(β-hydroxyethyl)terephtalate, bis(hydroxybutyl)terephtalate, polyoxyethylene bisphenol A, polyoxypropyrene bisphenol A, polyoxyethylene bisphenol, polyoxypropyrene bisphenol, and the like.

The polyol are, for example, glycerine, trimethylolpropane, trimethylolethane, triethanolamine, pentaerythritol, sorbitol, glycerol, 1,3,5-trihydroxymethylbenzen and the like.

The dicarboxylic acid are, for example, fumaric acid, maleic acid, succinic acid, itaconic acid, mesaconic acid, citraconic acid, glutaconic acid, phthalic acid, isophthalic acid, terephthalic acid, cyclohexanedicarboxylic acid, cyclohexenedicarboxylic acid, adipic acid, sebacic acid, dodecanoic diacid, naphthalenedicarboxylic acid, biphenyl-4,4-dicarboxylic acid, 2,3-piperazine-dicarboxylic acid, iminodicarboxylic acid, imidazol-4,5-dicarboxylic acid, piperazinedicarboxylic acid, N-phenylpyrazoldicarboxylic acid, pyridinedicarboxylic acid, carbazole-3,6-dibutyric acid, carbazole-3,6-γ,γ-diketobutyric acid, and the like.

The polycarboxylic acid are, for example, trimellitic acid, pyrromellitic acid, 1,2,4-cyclohexanetricarboxylic acid, 1,2,4-naphtalenetricarboxylic acid, 2,5,7-naphtalenedicarboxylic acid, pyridinetricarboxylic acid, pyridine-2,3,4,6-tetracarboxylic acid, 1,2,7,8-tetracarboxylic acid, butanetetracarboxylic acid, and the like.

The dicarboxylic acid having phenolic hydroxyl group are, for example, 4-hydroxyisophthalic acid, 5-hydroxyisophthalic acid, 4,6-dihydroxyisophthalic acid, 2,5-dihydroxy-1,4benzendiacetic acid, chelidomic acid, bis(2-hydroxy-3-carboxyphenyl)methane, and the like.

It is possible to control a hydroxyl value and an acid value of the obtained polyester resins co-existed composition by controlling the mixture ratio between polyhydric alcohol and the short chain aliphatic/aromatic polybasic acid component, particularly a mixture ratio between the diol component and the dicarboxylic acid, anhydride thereof, low alkyl ester thereof, and the like.

The number average molecular weight (Mn) of the polyester oligomer (P) in the reaction system A is preferably 3000 or less, more preferably in the range of 1500 to 3000. The polyester oligomer (P) having a number average molecular weight of 3000 or greater does not react satisfactorily with long chain aliphatic carboxylic acid in the second reactional stage. In the case of using the polyester oligomer (P) having a number average molecular weight of 1500 or less, the glass translation temperature of the obtained polyester resins is low.

In the second reactional stage, a polyester (P2) of polyester oligomer-long chain aliphatic carboxylic acid was obtained by adding long chain aliphatic carboxylic acid to the obtained polyester oligomer in the reactional system A, and reacting both. This is defined as a reactional system B. In the second reactional stage, while a polymer of polyester oligomer-long chain aliphatic carboxylic acid polymer (P2) was prepared in reactional system B, polymer (P1) of polyester oligomer was prepared in the reactional system A in the first reactional stages.

Long chain aliphatic carboxylic acid used in the second reactional stage is preferable to long chain aliphatic monocarboxylic acid having 12 or greater carbon atoms (hereinafter referred to as "long chain aliphatic monocarboxylic acid") and long chain aliphatic diocarboxylic acid having 12 or greater carbon atoms (hereinafter referred to as "long chain aliphatic diocarboxylic acid").

The long chain aliphatic monocarboxylic acid and long chain aliphatic diocarboxylic acid used in the present invention are preferable to alkane compounds and alkenyl compounds which have carbon atoms of 12 or greater and have a reactional group such as a carboxyl group. Moreover if 2 or more reactional groups are existed, it is preferable to connect the reactional groups with a compound having 6 or more, preferably 10 or more carbon atoms. The bonding between the reactional groups may be linear chain or branched chain.

Preferable long chain aliphatic monocarboxylic acid are, for example, lauric acid (12 carbon atoms), palmitic acid (16 carbon atoms), stearic acid (18 carbon atoms), oleic acid (18 carbon atoms), low alkyl esters thereof, and the like.

Preferable long chain aliphatic dicarboxylic acid are, for example, hexadecanoic diacid (16 carbon atoms), octadecanoic diacid (18 carbon atoms), eicosanoic diacid (20 carbon atoms), polyethyleneglycoldicarboxylic acid, mixtures thereof, low alkyl esters thereof, and the like.

The long chain aliphatic carboxylic acid used in the second reactional stage has 12 or more carbon atoms, therefore the compound is more flexible than the polyester oligomer (P). It is possible to improve the flexibility of the obtained polyester oligomer. Therefore, the toner using the polyester oligomer (P) has an offset preventing effect.

When the long chain aliphatic carboxylic acid is used in the present process, amount of the long chain aliphatic carboxylic acid added is only in a range of 0.1 mol % to 50 mol % with respect to 100 mol % of the carboxyl groups of the short chain aliphatic/aromatic polybasic acid component. As the polyester oligomers are mainly cross-linked with long chain carboxylic acid, it is possible to prevent the decrease of glass transition point, i.e. to maintain the glass transition point of its toner for 50° C. or greater. Consequently, a sufficient storage period can be obtained. When the amount of the long chain aliphatic carboxylic acid added is less than 0.1 mol % with respect to 100 mol % of the carboxyl groups of the short chain aliphatic/aromatic polybasic acid component, it is not possible to sufficiently improve the elasticity of the polyester resins. Conversely, when the amount added exceeds 50 mol %, although sufficient elasticity can be obtained, polyester resins having low glass transition points are produced.

In order to obtain a sufficient elasticity using the long chain aliphatic carboxylic acid having 11 or less carbon atoms, a larger amount of the long chain aliphatic carboxylic acid having 12 or more of carbon atoms is needed. Therefore, it is difficult to maintain the general glass transition point. That is, if the glass transition point of the toner is less than 50° C., then the toner has a storage problem.

The heat properties of the prepared polyester resins can be controlled by changing the number of carbon atoms of the long chain aliphatic carboxylic acid or by the number of unsaturated groups of the long chain aliphatic carboxylic acid.

Additionally, it is noted here that the phrase "is reacted" in reaction system B indicates as follows:

The case where a long chain aliphatic monocarboxylic acid having 12 or more carbon atoms is employed as the long chain aliphatic carboxylic acid indicates "grafting" of the polymer (P2) of polyester oligomer-long chain aliphatic carboxylic and a long chain aliphatic monocarboxylic acid having 12 or more carbon atoms.

The case where a long chain aliphatic dicarboxylic acid having 12 or more carbon atoms is employed as the long chain aliphatic carboxylic acid indicates "cross-linking and grafting" of a polyester oligomer (P) and a long chain aliphatic dicarboxylic acid having 12 or more carbon atoms.

The case where a long chain aliphatic monocarboxylic acid having 12 or more carbon atoms and a long chain aliphatic dicarboxylic acid having 12 or more carbon atoms are employed as the long chain aliphatic carboxylic acid indicates "cross-linking and grafting" of a polyester oligomer (P) and a long chain aliphatic monocarboxylic acid having 12 or more carbon atoms and a long chain aliphatic dicarboxylic acid having 12 or more carbon atoms.

The polyester resins of this invention can be prepared, which is co-existed of the polymer (P1) of polyester oligomer (P) prepared in the reactional system A and the polymer (P2) of polyester oligomer-long chain aliphatic carboxylic acid prepared in the reactional system B.

Among the polyester resins obtained using the aforementioned production method, particularly desirable are the resins having glass transition temperatures of 50° C. or higher as measured by a differential scanning calorimeter and a flow softening point of 80° C. or higher as measured by a flow tester.

When the glass transition point is 50° C. or less, the stability of the toner during storage can decline. Further, it is not desirable for the flow softening point to be less than 80° because the storage stability of the toner may decline in this case as well.

The toner of the present invention can be obtained by dispersing and mixing the binder resin and additives, such as a pigment, charge controlling agent, and the like, kneading and pulverizing them.

In the present invention, the polyester resins is used as a main binder resin, however styrene/acrylic ester copolymer and the like can be added to the polyester resins.

Representative examples of said pigment include, carbon black, aniline black, phthalocyanine blue, quinoline yellow, malachite green, lamp black, rhodamine-B, quinaclidone, and the like. In general, the pigment is added at a ratio of 1-20 weight parts to 100 weight parts of the binder resin.

The charge controlling agents are classified into a positive charge controlling agent and a negative charge controlling agent. The positive charge controlling agent is, for example, nigrosine dye, ammonium salt, pyridinium salt, azine and the like. The negative charge controlling agent is, for example, chrome complex, iron complex, and the like. In generally, the charge controlling agents are added at a ratio of 0.1-10 weight parts to 100 weight parts of the binder resin.

A comparison of the toners obtained by the production methods of the present invention and toners obtained by conventionally known methods reveals that toners obtained by the production method of the present invention have the following advantageous features.

(1) In conventionally known methods the product of the reaction between long chain aliphatic carboxylic acid and polyhydroic alcohol is used in place of the short chain aliphatic/aromatic polybasic acid component in the reaction system A shown in FIG. 1. The long chain aliphatic carboxylic acid is thought to be introduced into the main chain of the polyester resin obtained by this production method. As a result, a resin which has low grass transition point is obtained. Accordingly, because a resin having a low glass transition point is used as the binder resin, the toner obtained by a conventionally known production method has low glass transition point and is problematic with regard to its storage periods.

In contrast, in the toner obtained using the production method of the present invention, the long chain aliphatic carboxylic acid is thought to be introduced as a cross-linker component or a side chain of the polymer (P2) of polyester oligomer-long chain aliphatic carboxylic acid. For this reason, it is thought that a resin having a high glass transition point is obtained. Accordingly, by means of the toner production method of the present invention, it is possible to provide a toner which has a high glass transition point and which is superior in regard to its stability during storage.

(2) In order to obtain toner having an expanded fixing temperature range, the technique of expanding the fixing temperature range by employing several varieties of resins as the binder resin has been widely proposed in the past. However, in general, resins which has expanded fixing temperature ranges have also had poor compatible to other resin. Even if kneaded, it is still difficult to obtain a resin which has been sufficiently kneaded uniformly.

In contrast, the polyester resin obtained by the production method of the present invention has sufficiently expanded fixing temperature range. Accordingly, it is not necessary to mix the resin with other resins in order to expand the fixing temperature range.

Next, an explanation will be made of the second toner production method of the present invention with reference being made to FIG. 2.

In the second reactional stage in this production method, a polybasic acid and a short chain aliphatic/aromatic alcohol component are reacted together (indicated as reaction system C).

Preferred examples of the polybasic acid included dicarboxylic acid, dicarboxylic acid having a phenolic hydroxyl group, polycarboxylic acid, and anhydrides and low order alkyl esters of these.

Preferred examples of the short chain aliphatic/aromatic alcohol component include diol and/or polyol.

The preferred combinations of these components are:

(a) As the polybasic acid: dicarboxylic acid, or anhydride or low alkyl ester thereof, and dicarboxylic acid having a phenolic hydroxyl group, an anhydride of a low alkyl ester thereof.

As the short chain aliphatic/aromatic alcohol component: diol.

(b) As the short chain aliphatic/aromatic alcohol component in (a): additionally add a polyol component.

(c) As the polybasic acid in (b): additionally add a polycarboxylic acid, or an anhydride or low alkyl ester thereof.

(d) As the polybasic acid in (a): additionally add polycarboxylic acid, or an anhydride or low alkyl ester thereof.

Next, an explanation will be made of each component employed in reaction system B.

Preferably as the diol are diethanolamine, ethyleneglycol, diethylenglycol, propyleneglycol, isopreneglycol, octanediol, 2,2-diethyl-1,3-propandiol, spiroglycol, neopentylglycol, 1,3-butanediol, 1,4-butanediol, 2-butyl-2-ethyl-1,3-propanediol, 1,6-hexanediol, hexyleneglycol, 1,5-pentanediol, 3-methyl-1,5-pentanediol, hydrobenzoin, bis(β-hydroxyethyl)terephthalate, bis(hydroxybutyl)terephthalate, polyoxyethylene bisphenol A, polyoxypropylene bisphenol A, polyoxyethylene biphenol, polyoxypropylene biphenol, and the like.

Preferable as the polyol are glycerol, trimethylolpropane, trimethylolethane, triethanolamine, pentaerythritol, sorbitol, glycerol, 1,3,5-trihydroxymethylbenzen, and the like.

With regard to the polybasic acids preferred for use in reaction system C—namely, dicarboxylic acid, polycarboxylic acid, dicarboxylic acid having a phenolic hydroxyl group, and anhydrides and low alkyl esters of these—the same compounds as that employed as the short chain aliphatic/aromatic polybasic acid component the reactional system A can be used.

By adjusting the blending ratio of the polybasic acid and the short chain aliphatic/aromatic alcohol component in reaction system C, it is possible to control the hydroxyl value and the acid value of the obtained polyester resins.

Among the polyester oligomers obtained in the above first reactional stage, a polyester oligomer having a number average molecular weight (Mn) of 3000 or less, and preferably a number average molecular weight in the range of 1500 to 3000, is desirable for use in the present invention.

A polyester oligomer having a number average molecular weight (Mn) larger than 3000 is not preferable because it does not react well with the long chain aliphatic alcohol in the second reactional stage.

It is not desirable when the number average molecular weight is smaller than 1500 because it causes a decrease in the Tg of the obtained polyester resins.

Next, in the second reactional stage, long chain aliphatic alcohol is added to reaction system C, and reacted with the polyester oligomer (P') obtained in reaction system C to obtain a reaction product, namely, the polymer (P4) of the polyester oligomer-long chain aliphatic alcohol (hereinafter this being reaction system D). In this second reactional stage, reaction system D is progressed while at the same time reaction system C in the first reactional stage also progressed, obtaining the polymer (P3) of polyester oligomer. By progressing reaction systems C and D simultaneously, the polyester resins mentioned in the present invention, wherein the polymer (P3) of polyester oligomer and the polymer (P4) of the polyester oligomer-long chain aliphatic alcohol are co-existed, can be obtained.

Next, by performing the same operations as in the aforementioned first production method using the obtained polyester resins, a toner having the same excellent properties can be obtained.

As the long chain aliphatic alcohol added in the second reactional stage, a long chain aliphatic monoalcohol having 12 or more carbon atoms, and long chain aliphatic diols and polyols having 12 or more carbon atoms are preferable.

The long chain aliphatic polyol, long chain aliphatic diol and long chain aliphatic monoalcohol used in the present invention are alkenyl compounds or alkane compounds with 12 or more carbon atoms having reactive groups such as hydroxyl groups. When there are two or more reactive groups, it is preferable that there be six or more and preferably 10 or more, carbon atoms between the groups. Furthermore, linear chain or branching structure may join the reactive groups.

Further, by adjusting the number of carbon atoms in the long chain aliphatic alcohol and the hydroxyl group content, it is possible to control the heat characteristics of the obtain polyester resins.

As the preferred long chain aliphatic monoalcohol having 12 or more carbons, there are available 1-dodecanol(12 carbon atoms), pentadecanol (15 carbon atoms), hexadecanol (16 carbon atoms). 9, 12-octadecan diethanol (18 carbon atoms), 10, 12-pentacosadiene-1-ol (25 carbon atoms), and the like.

As the preferred long chain aliphatic diol having 12 or more carbon atoms, there are available 1, 12-dodecanediol (12 carbon atoms), 1, 14-tetradecanediol (14 carbon atoms), polyethyleneglycol, polytetramethyleneglycol and the like.

As the preferred long chain aliphatic polyol having 12 or more carbon atoms, there are available glycerin-tri 12-hydroxystearate, galactytol-hexapolyisopropyl ether and the like.

Because the long chain aliphatic component has a chemical structure similar to that of waxes, the aforementioned polyester resins has excellent comparability with respect to compounds which have the releasable characteristics of waxes or the like.

Because it has 12 or more carbon atoms, the long chain aliphatic alcohol used in the second reactional stage is flexible as compared to the polyester oligomer making it possible to improve the elasticity of the polyester resins obtained. Furthermore, toner obtained by using this polyester resin has superior efficiency with regard to preventing offsetting.

When a long chain aliphatic alcohol having 11 or less atoms is used, it becomes necessary to add a larger quantity of long chain aliphatic alcohol in order to obtain the necessary elasticity. Ordinarily, in the case then, it is difficult to maintain the necessary glass transition point because less than 50° C., toner containing such a resin is problematic with respect to its storage period.

Further, the long chain aliphatic alcohol having 12 or more carbon atoms may be added in the amount of 0.1 to 50 mol % with respect to 100 mol % of the hydroxyl group of the short cain aliphatic/aromatic alcohol component used in reaction system C. Because the long chain aliphatic alcohol having 12 or more carbon atoms is introduced as the joiner for the polyester oligomer, a decrease in the Tg of the main chain does not occur. Accordingly, for a toner which contains this resin, the glass transition temperature can be held within the range of temperatures (50° C. or higher) ordinarily used. Thus, it is possible to obtain excellent capabilities with respect to storage period.

When the amount of the long chain aliphatic alcohol added is less than 0.1 mol % with respect to 100 mol % of the hydroxyl groups of the short chain aliphatic/aromatic alcohol component, it is not possible to sufficiently improve the elasticity of the polyester resins. Conversely, when the amount added exceeds 50 mole %, although sufficient elasticity can be obtained only polyester resins having low glass transition points are produced.

Among the polyester resins obtained using the aforementioned production method, particularly desirable are resins having glass transition temperatures of 50° C. or higher as measured by a differential scanning calorimeter and a flow softening point of 80° C. or higher as measured by a flow tester.

When the glass transition point is 50° C. or less, the stability of the toner during storage can decline. Further, it is not desirable when the flow softening point is less than 80° because stability of the toner during storage of the toner may decline in this case as well.

Additionally, it is noted here that the phrase "is reacted" in reaction system D indicates as follows:

The case where a long chain aliphatic monoalcohol having 12 or more carbon atoms is employed as the long chain aliphatic alcohol indicates "grafting" of the polyester oligomer (P') and a long chain aliphatic alcohol.

The case where a long chain aliphatic diol having 12 or more carbon atoms is employed as the long chain aliphatic alcohol indicates cross-linking and "grafting and cross-linking" of a polyester oligomer (P') and a long chain aliphatic diol.

The case where a long chain aliphatic polyol having 12 or more carbon atoms is employed as the long chain aliphatic alcohol indicates "grafting and cross-linking" of a polyester oligomer (P') and a long chain aliphatic diol.

The case where a long chain aliphatic monoalcohol having 12 or more carbon atoms, a long chain aliphatic diol having 12 or more carbon atoms, and a long chain aliphatic polyol having 12 or more carbon atoms are employed as the long chain aliphatic alcohol indicates "grafting and cross-linking" of a polyester oligomer (P') and a long chain aliphatic monoalcohol having 12 or more carbon atoms, a long chain aliphatic diol having 12 or more carbon atoms, and a long chain aliphatic polyol having 12 or more carbon atoms.

Additionally, in the present specification, glass transition points were measured using a DSC at a temperature increase speed of 10° C./min and a heating temperature range of 0° C. to 130° C.

Initial melting temperatures and flow softening points were measured using a flow tester CFT-500C manufactured by SHIMAZU SEISAKUJYO under the conditions of preliminary heating temperature range of 50° C. to 80° C., a load of 50kgF and a temperature increase speed of 6° C./min. Under these conditions, the initial melting temperature was designated to be the temperature at the time when the plunger's descent began. Similarly, the flow softening point was designated to be the temperature at the time when the plunger had traversed half the distance between the point where it began its descent and the bottom of the apparatus.

Moreover, a known method was employed to measure number average molecular weight. Measurements can be made under the following conditions using gel permeation chromatography. Namely, a solvent tetrahydrofuran at 25° C. is made to flow at a speed of 1 ml per minute and 8 mg of a tetrahydrofuran sample solvent having a density of 0.4 gr/dl is poured in as a sample weight, and measurements are made. Further, when the molecular weight of the sample is measured, the measurement conditions are selected so that the molecular weight distribution of each samples is in the linear part of a standard curve obtained from some kinds of simple dispersing polystyrene standard samples. Moreover, under the measuring conditions, Mw/Mn of NBS 706 polystyrene standard sample (Mw=28.8×10$^4$, Mn=13.7×10$^4$, Mw/Mn=2.11) was 2.11±0.10. Therefore, the reliability of the result was confirmed.

DETAILED DESCRIPTION OF THE PREFERRED EXAMPLES

The present invention will be explained in detail hereinbelow with reference to the examples.

EXAMPLE 1

| | |
|---|---|
| polyoxyethylene bisphenol A (2,2'-bis[4-(2-hydroxyethyleneoxy)phenyl]propane) | 316 g (1 mol) |
| pentaerythritol | 6.8 g (0.05 mol) |
| isophthalic acid | 166 g (1 mol) |
| dibutylated tin oxide | 2.5 g |

The mixture of the above-described composition was put into a round bottom flask having four inlet portions provided with an agitator, a condenser, and an inlet for nitrogen gas. A polyester oligomer was obtained by reacting the mixture while introducing a nitrogen gas from the inlet, heating the mixture at 200° C., and removing the water. The number average molecular weight (Mn) of the obtained polyester oligomer was 2400.

Polyester resins was obtained by reacting 0.71 g (0.005 mol, 0.5 mol % per 100 mol % of total carboxyl components) of eicosanoic diacid with the obtained polyester oligomer under a nitrogen atmosphere, at 230° C. for 3 hours.

Glass-transition temperature, melt-initiation temperature, flow softening temperature, and number average molecular weight of the obtained polyester resins were measured.

The glass-transition temperature measured with DSC was 68° C., the melt-initiation temperature measured with flow a tester was 118° C., the flow softening temperature was 143° C., and the number average weight molecular (Mn) was 7800.

A mixture having the following composition was melted and kneaded at 150° C. by a biaxial extruder, was cooled, and was then pulverized by a jet-mill. Negatively charged toner particles were prepared by classifying the particles. The average diameter of the toners particle obtained was 8.5 µm.

| | |
|---|---|
| aforementioned polyester resins | 100 weight parts |
| carbon black (MA-100, produced by MITSUBISHI CHEMICAL INDUSTRIES Co., Ltd.) | 8 weight parts |
| metallic dye containing chromium ("Bontron S-34", produced by ORIENT CHEMICAL INDUSTRIES Co., Ltd.) | 2 weight parts |

Following this, the toners of this Example were prepared by mixing 0.5 parts of hydrophobic $SiO_2$ ("R-972" produced by AEROSIL Co., Ltd.) per 100 parts of the obtained toner particles using a Henschel Mixer.

EXAMPLE 2

| | |
|---|---|
| polyoxyethylene bisphenol A (2,2'-bis[4-(2-hydroxyethyleneoxy)phenyl]propane) | 248 g (0.9 mol) |
| isophthalic acid | 166 g (1 mol) |
| trimethylolpropane | 13.4 g (0.1 mol) |
| dibutylated tin oxide | 2.5 g |

The mixture of the above-described composition was put into a round bottom flask having four inlet portions provided with an agitator, a condenser, and an inlet for nitrogen gas. A polyester oligomer was obtained by reacting the mixture while introducing nitrogen gas from the inlet, heating the mixture at 200° C., and removing the removing the water. The number average molecular weight (Mn) of the obtained polyester oligomer was 2600.

Polyester resins was obtained by reacting 7 g (0.02 mol, 2 mol % per 100 mol % of the total carboxyl components) of linear long chain aliphatic monocarboxylic acid ("UNI-CID-350", produced by PETROLITE Co., Ltd.) with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 67.5° C., the melt-initiation temperature measured with flow tester was 122° C., the flow softening temperature was 160.9° C., and the number average weight molecular (Mn) was 8400.

The negatively charged toner was prepared which was in the same way as in Example 1.

EXAMPLE 3

| polyoxyethylene bisphenol A (2,2'-bis[4-(2-hydroxyethyleneoxy)phenyl]propane) | 316 g (1 mol) |
| pentaerythritol | 6.8 g (0.05 mol) |
| phthalic anhydride | 148 g (1 mol) |
| dibutylated tin oxide | 5 g |

A mixture of the above-described composition was put into a round bottom flask having four inlet portions provided with an agitator, a condenser, and an inlet for nitrogen gas. A polyester oligomer was obtained by reacting the mixture while introducing nitrogen gas from the inlet, heating the mixture at 200° C., and removing the water. The number average molecular weight (Mn) of the obtained polyester oligomer was 2000.

Polyester resins was obtained by reacting 8.5 g (0.025 mol, 2.5 mol % per 100 mol % of total carboxyl component) of unsaturated linear aliphatic dicarboxylic acid ("UL-20" (number of carbon atoms: 20), produced by OKAMURA SEIYU Co., Ltd.) with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 70° C., the melt-initiation temperature measured with flow tester was 114.2° C., the flow softening temperature was 149.8° C., and the number average weight molecular (Mn) was 6800.

The negatively charged toner was prepared which was identical to that of Example 1 of the present invention.

EXAMPLE 4

| polyoxyethylene bisphenol A (2,2'-bis[4-(2-hydroxyethyleneoxy)phenyl]propane) | 316 g (1 mol) |
| pentaerythritol | 6.8 g (0.05 mol) |
| isophthalic acid | 158 g (0.95 mol) |
| 5-hydroxyisophtalic acid | 9.1 g (0.05 mol) |
| dibutylated tin oxide | 5 g |

The mixture of the above-described composition was put into a round bottom flask having four inlet portions provided with an agitator, a condenser, and an inlet for nitrogen gas. A polyester oligomer was obtained by reacting the mixture while introducing nitrogen gas from the inlet, heating the mixture at 200° C., and removing the water. The number average molecular weight (Mn) of the obtained polyester oligomer was 2700.

Polyester resins was obtained by reacting 16.7 g (0.05 mol, 0.5 mol % per 100 mol % of carboxyl group of short chain aliphatic/aromatic polybasic acid component) of unsaturated aliphatic dicarboxylic acid ("ULB-20" (number of carbon atoms: 20), produced by OKAMURA SEIYU Co., Ltd.) with the obtained polyester oligomer under a condition of nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 70° C., the melt-initiation temperature measured with flow tester was 120° C., the flow softening temperature was 148° C., and the number average weight molecular (Mn) was 8300.

The negatively charged toner was prepared which was in the same way as in Example 1.

EXAMPLE 5

| polyoxyethylene bisphenol A (2,2'-bis[4-(2-hydroxyethyleneoxy)phenyl]propane) | 316 g (1 mol) |
| pentaerythritol | 6.8 g (0.05 mol) |
| isophthalic acid | 166 g (1 mol) |
| dibutylated tin oxide | 2.5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C., and removing the water. The number average molecular weight (Mn) of the obtained polyester oligomer was 2800.

Polyester resins was obtained by reacting 0.71 g (0.005 mol, 0.5 mol % per 100 mol % of total carboxyl component) of eicosanoic diacid, and 3 g (0.015 mol, 1.5 mol % per 100 mol % of total carboxyl component) of lauric acid (number of carbon atoms: 12, linear monocarboxylic acid) with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 64° C., the melt-initiation temperature measured with flow tester was 105° C., the flow softening temperature was 132° C., and the number average weight molecular (Mn) was 7100.

The negatively charged toner was prepared which was in the same way as in Example 1.

Comparative Example 1

A negatively charged toner was prepared which was in the same way as in Example 1, except that polyester resin (corresponding to polymer (P1) shown in FIG. 1) was prepared without eicosanoic diacid.

The glass-transition temperature, melt-initiation temperature, flow softening temperature, and number average molecular weight of the obtained polyester resin were measured.

The glass-transition temperature measured with DSC was 70° C., the melt-initiation temperature measured with flow tester was 128° C., the flow softening temperature was 155° C., and the number average weight molecular (Mn) was 12000.

Comparative Example 2

A negatively charged toner was prepared which was in the same way as in Example 2, except that polyester resin (corresponding to polymer (P1) shown in FIG. 1) was prepared without adding linear long chain aliphatic monocarboxylic acid.

The glass-transition temperature, melt-initiation temperature, flow softening temperature, and number average molecular weight of the obtained polyester resin were measured.

The glass-transition temperature measured with DSC was 71° C., the melt-initiation temperature measured with flow tester was 133° C., the flow softening temperature was 159° C., and the number average weight molecular (Mn) was 9500.

Comparative Example 3

A negatively charged toner was prepared which was in the same way as in Example 3, except that polyester resin (corresponds to polymer (P1) shown in FIG. 1) was prepared without adding unsaturated linear aliphatic dicarboxylic acid.

The glass-transition temperature, melt-initiation temperature, flow softening temperature, and number average molecular weight of the obtained polyester resin were measured.

The glass-transition temperature measured with DSC was 70° C., the melt-initiation temperature measured with flow tester was 128° C., the flow softening temperature was 155° C., and the number average weight molecular (Mn) was 11000.

Comparative Example 4

A negatively charged toner was prepared which was in the same way as in Example 4, except that polyester resin (corresponds to polymer (P1) shown in FIG. 1) was prepared without adding unsaturated aliphatic dicarboxylic acid.

The glass-transition temperature, melt-initiation temperature, flow softening temperature, and number average molecular weight of the obtained polyester resin were measured.

The glass-transition temperature measured with DSC was 72° C., the melt-initiation temperature measured with flow tester was 132° C., the flow softening temperature was 161° C., and the number average weight molecular (Mn) was 8000.

Comparative Example 5

Polyester resin (corresponding to polymer (P1) shown in FIG. 1) was prepared by reacting 14.2 g (0.1 mol, 10 mol % per 100 mol % of carboxyl group of short chain aliphatic/aromatic polybasic acid component) of eicosanoic diacid with the obtained polyester resin in the Comparative Example 1 under a nitrogen atmosphere, at 230° C. for 4 hours.

A negatively charged toner was prepared which was in the same way as in Comparative Example 1, except that the polyester was used instead of said obtained polyester resin.

The glass-transition temperature, melt-initiation temperature, flow softening temperature, and number average molecular weight of the obtained polyester resin were measured.

The glass-transition temperature measured with DSC was 62° C., the melt-initiation temperature measured with flow tester was 100° C., the flow softening temperature was 125° C., and the number average weight molecular (Mn) was 11000.

It appears that eicosanoic diacid did not react with the polyester resin in the Comparative Example 1. The glass-transition temperature was lower than that of the polyester resin obtained in the Comparative Examples 1.

Comparative Example 6

| | |
|---|---|
| polyoxyethylene bisphenol A (2,2'-bis[4-(2-hydroxyethyleneoxy]phenyl propane) | 316 g (1 mol) |
| pentaerythritol | 6.8 g (0.05 mol) |
| isophthalic acid | 149.4 g (0.9 mol) |
| eicosanoic diacid | 14.2 g (0.1 mol) |
| dibutylated tin oxide | 2.5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C. After removing the water, the temperature of the system of this reaction was rising gradually to 230° C. for 1 hour, and keeping the condition for 4 hours.

The glass-transition temperature, melt-initiation temperature, flow softening temperature, and number average molecular weight of the obtained polyester resins were measured.

The glass-transition temperature measured with DSC was 57° C., the melt-initiation temperature measured with flow tester was 110° C., the flow softening temperature was 138° C., and the number average weight molecular (Mn) was 15000.

The negatively charged toner was prepared which was in the same way as in Example 1.

Comparative Example 7

A negatively charged toner was prepared which was in the same way as in Example 1, except that polyester resin was replaced with the polyester resin mixture having the following composition.

Polyester resin 50 weight parts
(which was prepared without adding the long chain aliphatic carboxylic acid component in Comparative Example 1, corresponding to P1 of FIG. 1)

Polyester resin 50 weight parts
(prepared by adding long chain aliphatic carboxylic acid component in the early stages of polycondensation in Comparative Example 6)

The glass-transition temperature, melt-initiation temperature, flow softening temperature, and number average molecular weight of the obtained polyester resin mixture were measured.

The glass-transition temperature measured with DSC was 62° C., the melt-initiation temperature measured with flow tester was 133° C., the flow softening temperature was 152° C., and the number average weight molecular (Mn) was 13000.

Example 6

| | |
|---|---|
| polyoxyethylene bisphenol A (2,2'-bis[4-(2-hydroxyethyleneoxy)phenyl]propane) | 316 g (1 mol) |
| isophthalic acid | 91.3 g (0.55 mol) |

| | |
|---|---|
| phthalic anhydride | 81.4 g (0.55 mol) |
| butane tetracarboxylic acid | 4.1 g (0.02 mol) |
| dibutylated tin oxide | 2.5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C., and removing the water. The number average molecular weight (Mn) of the obtained polyester oligomer was 1600.

Polyester resins was obtained by reacting 8.7 g (0.05 mol, 5 mol % per 100 mol % of hydroxyl group of alcohol component) of 1,12-dodecandiol with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 68° C., the melt-initiation temperature measured with flow tester was 105° C., the flow softening temperature was 143° C., and the number average weight molecular (Mn) was 6800.

The negatively charged toner was prepared which was in the same way as in Example 1.

EXAMPLE 7

| | |
|---|---|
| polyoxyethylene bisphenol A (2,2'-bis[4-(2-hydroxyethyleneoxy)phenyl]propane) | 316 g (1 mol) |
| isophthalic acid | 149 g (0.9 mol) |
| trimellitic anhydride | 19.2 g (0.1 mol) |
| dibutylated tin oxide | 2.5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C., and removing the water. The number average molecular weight (Mn) of the obtained polyester oligomer was 2000.

Polyester resins was obtained by reacting 4 g (0.02 mol, 2 mol % per 100 mol % of hydroxyl group of alcohol component) of polyethylene glycol with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 66° C., the melt-initiation temperature measured with flow tester was 100° C., the flow softening temperature was 135° C., and the number average weight molecular (Mn) was 7200.

The negatively charged toner was prepared which was in the same way as in Example 1.

EXAMPLE 8

| | |
|---|---|
| polyoxyethylene bisphenol A (2,2'-bis[4-(2-hydroxyethyleneoxy)phenyl]propane) | 316 g (1 mol) |
| butane tetracarboxylic acid | 11.7 g (0.05 mol) |
| phthalic anhydride | 148 g (1 mol) |
| dibutylated tin oxide | 5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C., and removing the water. The number average molecular weight (Mn) of the obtained polyester oligomer was 1700.

Polyester resins was obtained by reacting 15 g (0.02 mol, 1.91 mol % per 100 mol % of hydroxyl group of alcohol component) of long chain aliphatic polymer, concretely polyetherpolyol having 6 functional groups (molecular weight: approximately 750, SP-750, produced by SANYO CHEMICAL Co., Ltd.) with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 64° C., the melt-initiation temperature measured with flow tester was 110° C., the flow softening temperature was 138° C., and the number average weight molecular (Mn) was 8000.

The negatively charged toner was prepared which was identical to that of Example 1 of the present invention.

EXAMPLE 9

| | |
|---|---|
| polyoxyethylene bisphenol A (2,2'-bis[4-(2-hydroxyethyleneoxy)phenyl]propane) | 252.8 g (0.8 mol) |
| bisphenol A propyleneoxide (2,2'-bis[4-(2-hydroxypropyleneoxy)phenyl]propane) | 68.8 g (0.2 mol) |
| terephtalic acid | 99.6 g (0.6 mol) |
| isophthalic acid | 66.4 g (0.4 mol) |
| trimellitic acid | 21 g (0.1 mol) |
| dibutylated tin oxide | 5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C., and removing the water. The number average molecular weight (Mn) of the obtained polyester oligomer was 1800.

Polyester resins was obtained by reacting 18.6 g (0.1 mol, 10 mol % per 100 mol % of hydroxyl group of alcohol component) of 1-dodecanol with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 65° C., the melt-initiation temperature measured with flow tester was 123° C., the flow softening temperature was 158° C., and the number average weight molecular (Mn) was 7400.

The negatively charged toner was prepared which was in the same way as in Example 1.

EXAMPLE 10

| | |
|---|---|
| polyoxyethylene bisphenol A (2,2'-bis[4-(2-hydroxyethyleneoxy)phenyl]propane) | 252.8 g (0.8 mol) |
| bisphenol A Propyleneoxide (2,2'-bis[4-(2-hydroxypropyleneoxy)phenyl]propane) | 68.8 g (0.2 mol) |
| terephtalic acid | 99.6 g (0.6 mol) |
| isophthalic acid | 66.4 g (0.4 mol) |
| trimellitic acid | 21 g (0.1 mol) |
| dibutylated tin oxide | 5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, heating the mixture to 200° C., and removing the water. The number average molecular weight (Mn) of the obtained oligomer was 1700.

Polyester resins was obtained by reacting 9.3 g (0.05 mol, 5 mol % per 100 mol % of hydroxyl group of alcohol component) of 1-dodecanol and 10.1 g (0.05 mol, 5 mol % per 100 mol % of hydroxyl group of alcohol component) of 1,12-dodecanediol with the obtained polyester oligomer under a nitrogen atmosphere, at 230° C. for 3 hours.

The glass-transition temperature, melt-initiation temperature, flow softening temperature, and number average molecular weight of the obtained polyester resins were measured.

The glass-transition temperature measured with DSC was 66° C., the melt-initiation temperature measured with flow tester was 120° C., the flow softening temperature was 144° C., and the number average weight molecular (Mn) was 8100.

The negatively charged toner was prepared which was in the same way as in Example 1.

Comparative Example 8

Figure 2:
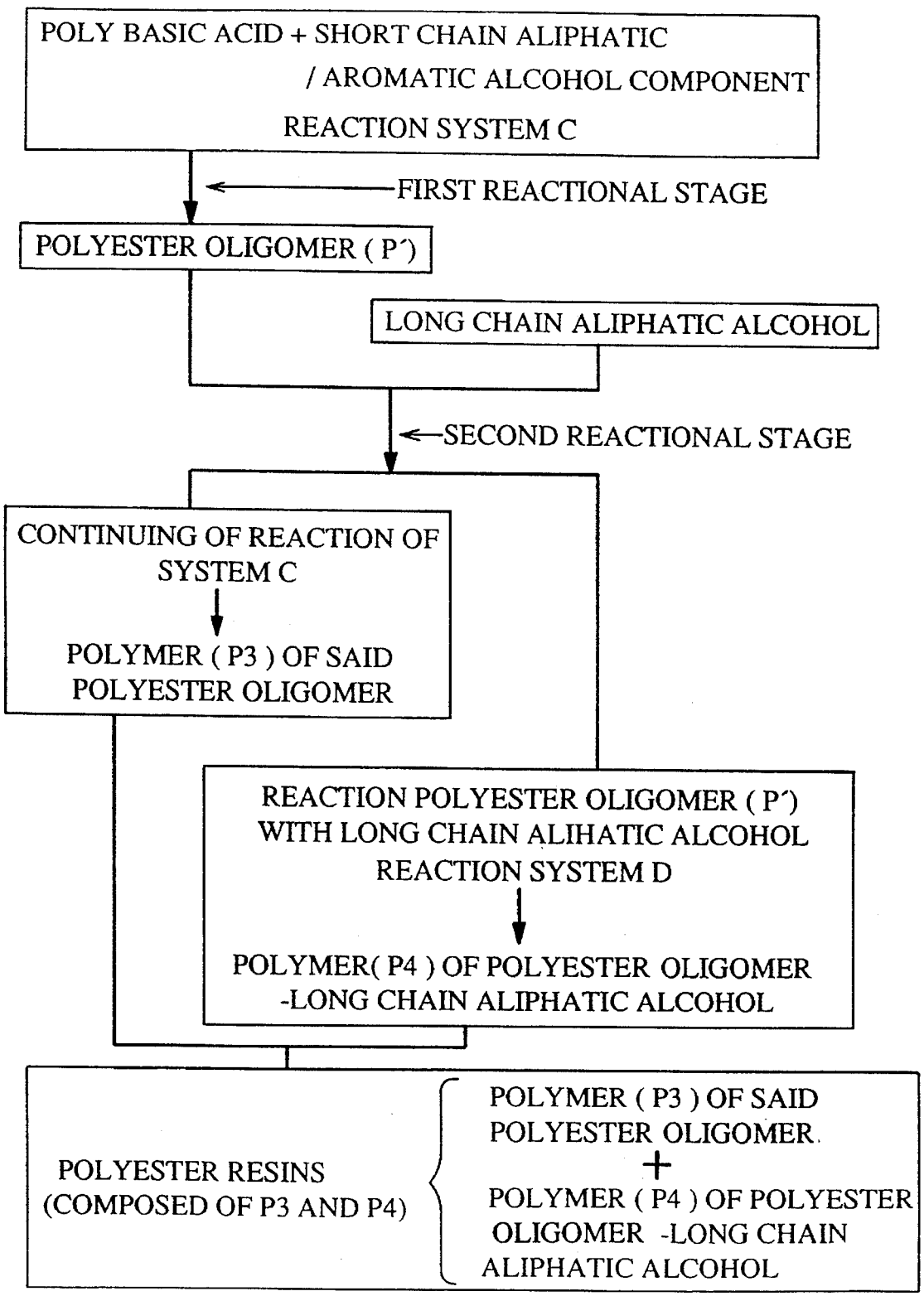
FIG. 2 shows the steps of the second production method of the present invention.

A negatively charged toner was prepared which was in the same way as in Example 6, except that polyester resin (corresponding to polymer (P3) shown in FIG. 2) was prepared without adding 1,12-dodecanediol.

The glass-transition temperature, melt-initiation temperature, flow softening temperature, and number average molecular weight of the obtained polyester resin were measured.

The glass-transition temperature measured with DSC was 68° C., the melt-initiation temperature measured with flow tester was 110° C., the flow softening temperature was 143° C., and the number average weight molecular (Mn) was 8000.

Comparative Example 9

A negatively charged toner was prepared which was in the same way as in Example 7, except that polyester resin (corresponding to polymer (P3) shown in FIG. 2) was prepared without adding polyethylene glycol.

The glass-transition temperature, melt-initiation temperature, flow softening temperature, and number average molecular weight of the obtained polyester resin were measured.

The glass-transition temperature measured with DSC was 72° C., the melt-initiation temperature measured with flow tester was 116° C., the flow softening temperature was 148° C., and the number average weight molecular (Mn) was 12000.

Comparative Example 10

A negatively charged toner was prepared which was in the same way as in Example 8, except that polyester resin (corresponding to polymer (P3) shown in FIG. 2) was prepared without adding the long chain aliphatic diol component.

The glass-transition temperature, melt-initiation temperature, flow softening temperature, and number average molecular weight of the obtained polyester resin were measured.

The glass-transition temperature measured with DSC was 75° C., the melt-initiation temperature measured with flow tester was 112° C., the flow softening temperature was 140° C., and the number average weight molecular (Mn) was 7500.

Comparative Example 11

A negatively charged toner was prepared which was in the same way as in Example 9, except that polyester resin (corresponding to polymer (P3) shown in FIG. 2) was prepared without adding 1-dodecanol.

The glass-transition temperature, melt-initiation temperature, flow softening temperature, and number average molecular weight of the obtained polyester resin were measured.

The glass-transition temperature measured with DSC was 74° C., the melt-initiation temperature measured with flow tester was 120° C., the flow softening temperature was 148° C., and the number average weight molecular (Mn) was 11000.

Comparative Example 12

Polyester resin was prepared by reacting 8.7 g (0.05 mol, 5 mol % per 100 mol % of hydroxyl group of alcohol component) of 1,12-dodecanediol with the obtained polyester resin in the Comparative Example 8 under a nitrogen atmosphere, at 230° C. for 4 hours.

A negatively charged toner was prepared which was in the same way as in Comparative Example 8, except that the polyester was used instead of said obtained polyester resin.

The glass-transition temperature, melt-initiation temperature, flow softening temperature, and number average molecular weight of the obtained polyester resin were measured.

The glass-transition temperature measured with DSC was 66° C., the melt-initiation temperature measured with flow tester was 105° C., the flow softening temperature was 128° C., and the number average weight molecular (Mn) was 7700.

It appeared that 1,12-dodecanediol did not react with the polyester resin in the Comparative Example 8. The glass-transition temperature was lower than that of the polyester resin obtained in Comparative Example 8.

Comparative Example 13

| | |
|---|---|
| polyoxyethylene bisphenol A (2,2'-bis[4-(2-hydroxyethyleneoxy)phenyl]propane) | 284.4 g (0.9 mol) |
| isophthalic acid | 91.3 g (0.55 mol) |
| phthalic anhydride | 81.4 g (0.55 mol) |
| butane tetracarboxylic acid | 4.1 g (0.02 mol) |
| 1,12-dodecanediol | 17.4 g (0.1 mol) |
| dibutylated tin oxide | 2.5 g |

The mixture of the above-described composition was put into a round bottom flask having four inlet portions provided with an agitator, a condenser, and an inlet for nitrogen gas. The polyester oligomer was obtained by reacting the mixture while introducing nitrogen gas from the inlet, and heating the mixture to 200° C. After removing the water, the temperature of the system of this reaction was increased gradually to 230° C. for 1 hour, and the conditions were maintained for 4 hours.

The glass-transition temperature, melt-initiation temperature, flow softening temperature, and number average molecular weight of the obtained polyester resin were measured.

The glass-transition temperature measured with DSC was 58° C., the melt-initiation temperature measured with flow tester was 120° C., the flow softening temperature was 145° C., and the number average weight molecular (Mn) was 5200.

The negatively charged toner was prepared which was in the same way as in Example 6.

Comparative Example 14

A negatively charged toner was prepared which was in the same way as in Example 6, except that polyester resin was replaced with the polyester resin mixture having the following composition.

| | |
|---|---|
| Polyester resin (which is prepared without adding the long chain aliphatic alcohol component in Comparative Example 8) | 50 weight parts |
| Polyester resin (prepared by adding long chain aliphatic alcohol component in the early stages of synthesis in Comparative Example 13) | 50 weight parts |

The glass-transition temperature, melt-initiation temperature, flow softening temperature, and number average molecular weight of the obtained polyester resin mixture were measured.

The glass-transition temperature measured with DSC was 63° C., the melt-initiation temperature measured with flow tester was 122° C., the flow softening temperature was 145° C., and the number average weight molecular (Mn) was 6500.

The following evaluation tests were performed on the obtained toner in the Examples and the Comparative Examples.

(1) Non Offset-Temperature Range, and Non Offset-Temperature Breadth

Two component developers were obtained, which were comprised of 5 parts of the obtained toners in the Examples and the Comparative Examples and 95 parts of Ferrite carrier (DFC 150S6, produced by DOWA TETSUHUN Co. Ltd.). The obtained developers were used to produce stripe test patterns of 20 mm X 50 mm on A4 size printing paper using a copying machine (Z-133, produced by SANYO ELECTRIC Co., Ltd.).

Next, a fixing device having a thermal fixing roll whose surface was covered with a fluorine-containing resin, and a press fixing roll whose surface was covered with silicone were used to fix the above unfixed test patterns. The fixing conditions were as follows: pressure of the press fixing roll at 10 g/mm$^2$, and roll speed at 200 mm/sec. The temperature of the surface of the thermal fixing roll was increased gradually. A temperature range in which no toner smudging was observed in a white margin of the printing sheet was defined as an Non-Offset-Temperature Range. A difference of temperature between the lowest temperature and the highest temperature in the Non Offset-Temperature Range was defined as the "Non-Offset-Temperature Breadth".

(2) Fixability

The unfixed test patterns were fixed by using a thermal fixing roll having a surface of 130 ° C. The image densities of the fixed test patterns were measured, after rubbing them with cotton pads under a constant rubbing pressure. The image densities were measured by an illuminameter (trade name: RD-914, marketed by Machbeth).

The fixability, in percent, was determined according to the following mathematical expression:

$$\text{(After-rubbing strength / as-fixed strength)} \times 100$$

(3) Repeated Copying Properties 10,000 printings were produced with a copying machine in which the two component developers comprising the obtained toners in the above item (1) were supplied.

The amounts of frictional electrification, and the image density were evaluated after 1 printing, and after 10,000 printings.

The amount of frictional electrification was in a range of $-25$ μc/g to $-29$ μc/g, which were evaluated by Brow-off measurement equipment (trade name: TB-200, marketed by Toshiba Chemical Co., Ltd.).

The image densities were more than 1.4 after 10,000 printings; the densities were evaluated by an illuminameter (trade name: Z-1001DP, marketed by Machbeth).

The smudging was less than 0.6 after 10,000 printings; the smudging was evaluated by a color-difference meter (trade name: Z-1001DP, marketed by Nippon Dennsyoku Industrial Co., Ltd.).

TABLE 1

| | Non-Offset Temperature Range | Breadth of Non-Offset Temperature | Fixability |
|---|---|---|---|
| Example 1 | 130–230 | 100 | 87 |
| Example 2 | 130–230 | 100 | 90 |
| Example 3 | 130–230 | 100 | 90 |
| Example 4 | 130–230 | 100 | 92 |
| Example 5 | 130–230 | 100 | 89 |
| Comparative Example 1 | 150–230 | 80 | *1 |
| Comparative Example 2 | 160–230 | 70 | *1 |
| Comparative Example 3 | 150–230 | 80 | *1 |
| Comparative Example 4 | 170–230 | 60 | *1 |
| Comparative Example 5 | 150–230 | 80 | *1 |
| Comparative Example 6 | 150–230 | 80 | *1 |
| Comparative Example 7 | 170–230 | 40 | *1 |

"*1" indicates it was not possible to measure the Fixability.

TABLE 2

| | Non-Offset Temperature Range | Breadth of Non-Offset Temperature | Fixability |
| --- | --- | --- | --- |
| Example 6 | 120–230 | 110 | 87 |
| Example 7 | 120–230 | 100 | 90 |
| Example 8 | 130–230 | 100 | 94 |
| Example 9 | 130–230 | 100 | 90 |
| Example 10 | 130–230 | 100 | 91 |
| Comparative Example 8 | 150–230 | 80 | *1 |
| Comparative Example 9 | 160–230 | 70 | *1 |
| Comparative Example 10 | 160–230 | 70 | *1 |
| Comparative Example 11 | 150–230 | 80 | *1 |
| Comparative Example 12 | 150–230 | 80 | *1 |
| Comparative Example 13 | 160–230 | 70 | *1 |
| Comparative Example 14 | 160–200 | 40 | *1 |

"*1" indicates it was not possible to measure the Fixability.

It is clear from Tables 1 and 2 that offset phenomena in the Examples of the present invention were not generated in a range from low temperature to high temperature. Non-Offset-Temperature Breadths of the toners in the Examples were broader than 100° C. It is confirmed that the toners in the Examples do not have any problems in practical use. Moreover, the fixability strength at 130 ° C. is more than 87%; therefore, it is confirmed that there are no problems in practical use.

In contrast, offset phenomena were generated by the toner prepared in the Comparative Examples in at lower temperatures, the Non-Offset Breadths of the toners in the Comparative Examples were lower than those of the toners of Examples. Concretely, offset phenomena were generated at 130° C. in all Comparative Examples. Therefore, the fixing strength evaluation tests could not be performed.

Polyester resin used in the toner of the Comparative 12 was obtained by reacting a polymer of polyester oligomer (corresponding to reaction product (P3) in FIG. 2) with a long chain aliphatic diol. The reaction did not proceed satisfactorily with the composition of polyester resin and the long chain aliphatic diol; therefore, good fixing properties of the toner could not be obtained.

Moreover, in Comparative Examples 6 and 13, the polyester resins were used as binder resins of the toners, which were prepared by adding, respectively, eicosanoic diacid and 1,12-dodecanediol to the systems A and C of reactions in the early stages of synthesis. These processes were carried out as before. It is believed that the eicosanoic diacid and 1,12-dodecanediol were introduced mainly at main chains of the polyester oligomer (P')(P) in these conventional processes. Therefore, polyester resin having a low glass-transition temperature can be prepared. As a result, the toners prepared in Comparative Examples 6 and 13 do not have storage stability properties.

In Comparative Examples 6 and 13, in order to broaden fixing temperature range, multifunctional compounds, such as pentaerythritol in Comparative Example 6, and butane tetracarboxylic acid in Comparative Example 13 were used.

The toner of the Comparative Example 7 was prepared by using butane tetracarboxylic acid in a conventional manner. The resin mixture which was used in the Comparative Example 7 was comprised of polyester resin (which was prepared in Comparative Example 1, and was prepared without adding the long chain aliphatic carboxylic acid component) and another polyester resin (which was prepared in Comparative Example 6, and was prepared by adding long chain aliphatic carboxylic acid component in the early stages of synthesis). The melting viscosity of the each polyester resins were high, therefore, it is impossible to mix uniformly these polyester resins when these polyester resins were melted and kneaded. Consequently, the properties of the prepared toner in the Comparative Examples 7 was worse than those of the toner prepared in the Comparative Examples 1 and 6.

It is confirmed that the same results were obtained in the Comparative Example 14 as the results of the Comparative Example 7.

What is claimed is:

1. A toner for developing an electrostatic image comprising at least a colorant and a binder resin, characterized in that the main component of the binder resin is a polyester resin, and the polyester resin is containing a polymer prepared by reacting a polyester oligomer and at least one compound selected from the group consisting of long chain alcohols and long chain carboxylic acids which have 12 or more carbon atoms wherein said polyester oligomer has a number average molecular weight (Mn) of 3000 or less and is prepared by polycondensing polyhydric alcohols with at least a component selected from the group consisting of aliphatic polycarboxylic acids having 11 or less carbon atoms, aliphatic dicarboxylic acids having 11 or less carbon atoms, anhydrides thereof, low alkyl esters thereof, aromatic polycarboxylic acids, aromatic dicarboxylic acids, anhydrides thereof, and low alkyl esters thereof.

2. A toner for developing an electrostatic image as claimed in claims 1, wherein said long chain carboxylic acid having 12 or more carbon atoms is at least a carboxylic acid selected from the group consisting of aliphatic polycarboxylic acid, aliphatic dicarboxylic acid, and aliphatic monocarboxylic acid.

3. A toner for developing an electrostatic image as claimed in claim 1, wherein said long chain alcohol having carbon atoms of 12 or greater is at least an alcohol acid selected from the group consisting of aliphatic polyols, aliphatic diols, and aliphatic monoalcohols.

4. A toner for developing an electrostatic image as claimed in claim 1, wherein said polyester oligomer has a number average molecular weight (Mn) of 3000 or less, and is prepared by polycondensing polybasic acids with at least a component selected from the group consisting of aliphatic polyols having 11 or less carbon atoms, aliphatic diols having 11 or less carbon atoms, aromatic polyols, aromatic diols.

5. A toner for developing an electrostatic image as claimed in claim 1, wherein said polyester oligomer has a number average molecular weight (Mn) of 3000 or less, and is prepared by reacting a diol component with components selected from the group consisting of aliphatic dicarboxylic acids having 11 or less carbon atoms, aromatic dicarboxylic acids, dicarboxylic acids having phenolic hydroxyl group, anhydrides thereof, and low alkyl esters thereof.

6. A toner for developing an electrostatic image as claimed in claim 1, wherein said polyester oligomer has a number average molecular weight (Mn) of 3000 or less, and is prepared by reacting alcohol components selected from the group consisting of a diol component and a polyol component, with dicarboxylic compound selected from the group consisting of aliphatic dicarboxylic acids having 11 or less carbon atoms, aromatic dicarboxylic acids, aromatic dicarboxylic acids having phenolic hydroxy group, anhydrides thereof, and low alkyl esters thereof.

7. A toner for developing an electrostatic image as claimed in claim 1, wherein said polyester oligomer has a number average molecular weight (Mn) of 3000 or less, and is prepared by reacting diol components with carboxylic components comprising at least dicarboxylic compound selected from the group consisting of aliphatic dicarboxylic acids having 11 or less carbon atoms, aromatic dicarboxylic acids, aromatic dicarboxylic acids having phenolic hydroxy group, anhydrides thereof and low alkyl esters thereof, and polycarboxylic compound selected from the group consisting of aliphatic polycarboxylic acids having 11 or less carbon atoms, aromatic polycarboxylic acids, anhydrides thereof and low alkyl esters thereof.

8. A toner for developing an electrostatic image as claimed in claim 1, wherein said polyester oligomer has a number average molecular weight (Mn) of 3000 or less, and is prepared by reacting alcohol components comprising at least a diol and polyol with carboxylic components comprising at least a dicarboxylic compound selected from the group consisting of aliphatic dicarboxylic acids have 11 or less carbon atoms, aromatic dicarboxylic acids, aromatic dicarboxylic acids having phenolic hydroxy group, anhydrides thereof and low alkyl esters thereof, and a polycarboxylic compound selected from the group consisting of aliphatic polycarboxylic acids having 11 or less carbon atoms, aromatic polycarboxylic acids, anhydrides thereof and low alkyl esters thereof.

9. A production process of a toner for developing an electrostatic image characterized in consisting of the steps of:

a first reactional stage wherein a polyester oligomer is obtained by reacting a polyhydric alcohol with a compound selected from the group consisting of an aliphatic polybasic acid component having 11 or less carbon atoms and an aromatic polybasic acid component;

a second reactional stage wherein a polyester resin containing a polymer, the polymer is prepared by reacting the polyester oligomer with at least one compound selected from the group consisting of long chain carboxylic acids which have 12 or more carbon atoms; and a process wherein additives such as a colorant are added to the obtained polyester resins, melted and kneaded, and then pulverized and classified.

10. A production process of a toner for developing an electrostatic image characterized in consisting of the steps of:

a first reactional stage wherein a polyester oligomer is obtained by reacting a polybasic acid with a compound which is selected from the group consisting of an aliphatic polyhydric alcohol component having 11 or less carbon atoms and an aromatic polyhydric alcohol component;

a second reactional stage wherein a polyester resins containing a polymer, the polymer is prepared by reacting the polyester oligomer with at least one compound selected from the group consisting of a long chain alcohols having 12 or more carbon atoms; and a process wherein additives such as a colorant are added to the obtained polyester resins, melted and kneaded, .and then pulverized and classified.

* * * * *